United States Patent [19]

Cavazos

[11] Patent Number: 5,167,688
[45] Date of Patent: Dec. 1, 1992

[54] APPARATUS FOR MOLD COOLING

[76] Inventor: Guillermo Cavazos, Miguel De Cervantes 810, Colinas De San Jeronimo, Monterrey, N.L., Mexico, 64630

[21] Appl. No.: 330,915

[22] Filed: Mar. 31, 1989

Related U.S. Application Data

[63] Continuation-in-part of Ser. No. 152,323, Feb. 4, 1988, Pat. No. 4,824,461.

[51] Int. Cl.$^5$ ............................................. C03B 9/38
[52] U.S. Cl. ........................................ 65/83; 65/162; 65/265; 65/319; 65/356
[58] Field of Search ................... 65/83, 162, 265, 319, 65/356

[56] References Cited

U.S. PATENT DOCUMENTS 4,519,827  5/1985  Jones ..................................... 65/162
4,824,461  4/1989  Cavazos ................................ 65/162

Primary Examiner—Joye L. Woodard
Attorney, Agent, or Firm—Shlesinger, Arkwright & Garvey

[57] ABSTRACT

A mold cooling arrangement includes a plurality of closed bores vertically disposed in the mold between the molding surface and the mold exterior. A manifold positioned vertically above the mold communicates with the interior of each bore and a condenser is disposed vertically above and communicates with the manifold. The bores and manifold are at least partially filled with a phase change liquid such as distilled water which during operation of the mold is partially vaporized. The vapor rises to the condenser where it is converted back to liquid and returns by gravity to the manifold and mold bores. The rate of heat transfer from the mold to the liquid is controlled by developing an electrical signal proportional to mold temperature and using the difference between that signal and a set reference temperature signal to control the rate of flow of a secondary coolant into the condenser of the system in order to vary the pressure in the system, in turn, to control the rate of mold cooling.

1 Claim, 2 Drawing Sheets

APPARATUS FOR MOLD COOLING

This application is a continuation-in-part of my co-pending case Ser. No. 152,323, filed Feb. 4, 1988, now U.S. Pat. No. 4,824

BACKGROUND OF THE INVENTION AND RELATION TO PRIOR ART

In the glass molding industry, and particularly in the operation of plural mold machines for the manufacture of bottles or the like, the cooling of the molds is critical in terms of mold life, quality of molded product and speed of operation of the molding machine. The faster the operation of the machine, the greater number of units manufactured per unit time and the greater the amount of heat added to the molds per unit time becomes. It has been apparent therefore, that in order to speed up the operation of a machine of this type, the excess mold heat must be uniformly removed and at a correspondingly faster rate of heat transfer. In the past, air cooled molding arrangements have been employed, but these are inefficient and may require electrically driven fans with motor ratings of the order of 250 horsepower. To effect a more efficient cooling process, the use of liquid rather than air cooling was proposed, but not only was this difficult to control, but in most cases, it resulted in too rapid a chilling of the mold with a consequent decrease in quality of the molded product. In my aforementioned co-pending application, I have suggested a cooling process wherein each mold is formed with a plurality of blind axially extending bores between the mold surface and the mold exterior, and these bores are at least partially filled with a phase change liquid such, for example, as distilled water. By connecting the upper ends of these blind bores to a common manifold and arranging a condenser vertically above that manifold and connecting the two with a vertically extending closed conduit, I have shown that it is possible to increase the efficiency of mold cooling by causing the heat from the molding material to be transferred from the mold proper to the phase change liquid causing it to vaporize, move upwardly through the common manifold to the condenser and then fall back by gravity to the individual blind bores from which it originated.

I have since discovered that the most efficient cooling is when the heat of the mold is transferred not to a liquid, but to a vapor which is in contact with the walls of the plurality of blind bores.

Particularly in the case of multiple cavity molds, it is advantageous to utilize a separate common manifold for the blind bores in each mold half. Taking as an example a three cavity mold, the center cavity has less exposed surfaces than the outer two and therefor requires more cooling. By using a separate manifold for each mold half, it is possible to provide and control different cooling rates for individual mold cavities and thereby insure uniform quality of all articles formed in multiple cavity molds.

With the apparatus of this invention, it becomes possible to achieve a mold cooling rate which is inversely proportional to the flow rate of secondary coolant through the condenser.

BRIEF DESCRIPTION OF THE INVENTION

In accordance with the present invention, the rate of heat transfer from the mold to the phase change liquid is accurately controlled and related to the speed of operation of the molding machine. Such control is effected by developing an electrical signal proportional to mold temperature and using the difference between such signal and a set reference temperature signal to control the rate of flow of a secondary coolant into the condenser of the system in order to vary the pressure in the system, in turn, to control the rate of mold cooling.
dr

BRIEF DESCRIPTION OF THE DRAWING

FIG. 3 is a side elevation partially in section showing a bottle in a mold half with two of the blind bores shown in dotted line;

FIG. 4 is a top plan view of one half of the mold shown in FIG. 3;

DETAILED DESCRIPTION OF THE DRAWING

Figure 1:
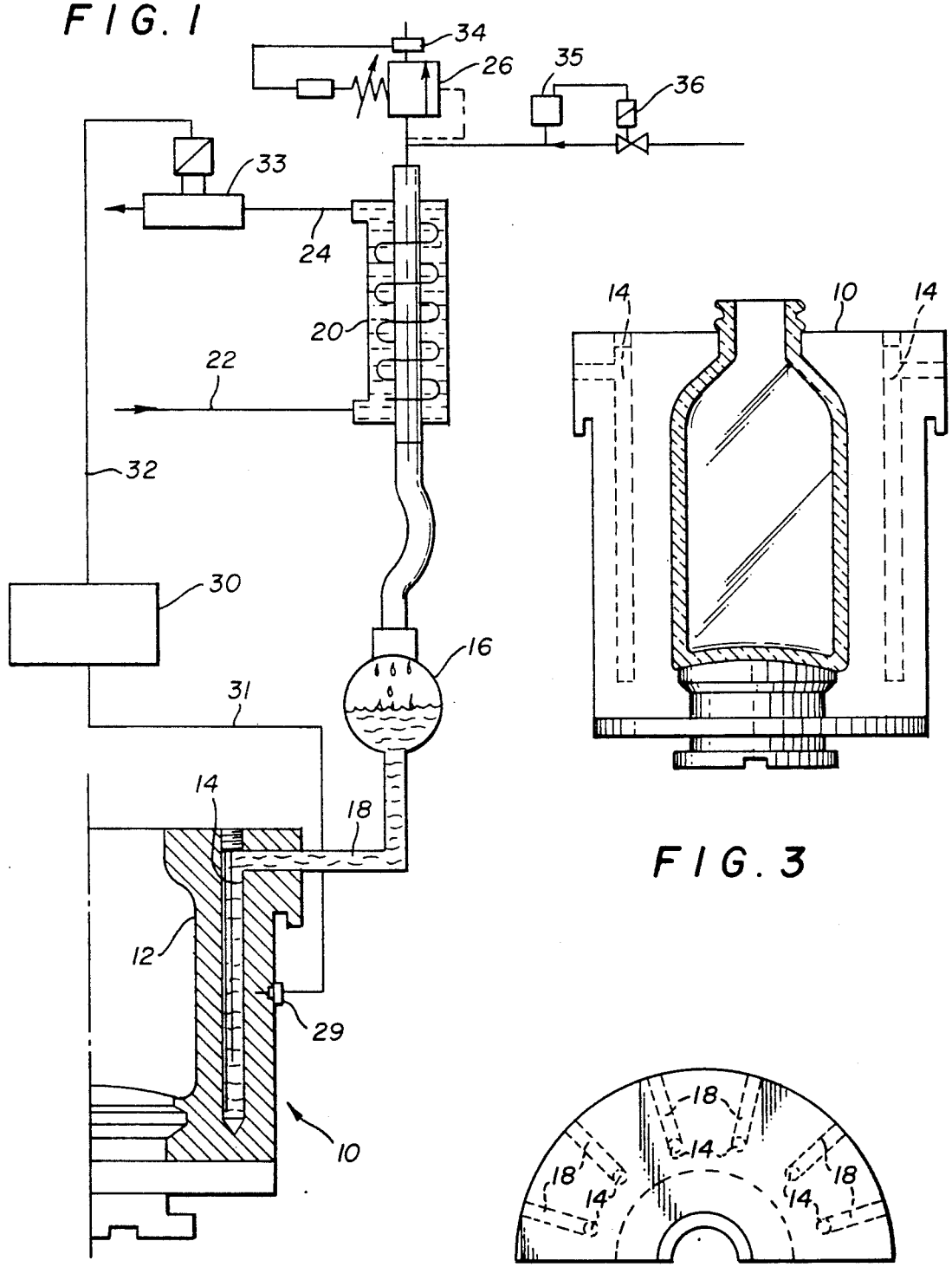
FIG. 1 is a diagramatic showing of the overall system.
Figure 2:
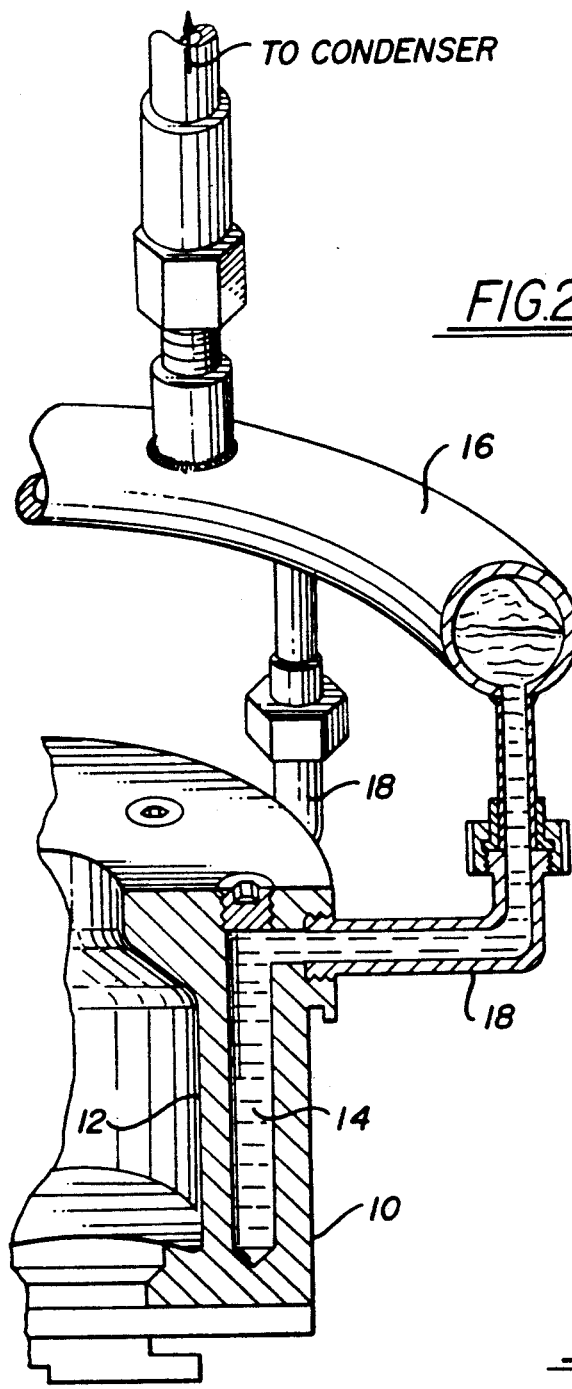
FIG. 2 is a partial sectional view of a portion of a mold together with a portion of the manifold and condenser.
Figure 5:
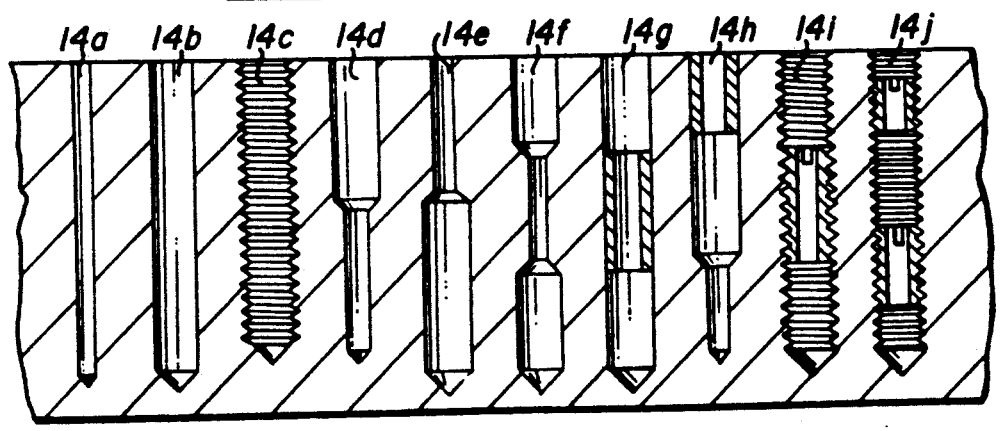
FIG. 5 is a diagramatic illustration of different forms of the bores in the mold.

It will be readily appreciated that FIGS. 2-5 of the present case are the same as the corresponding figures in my co-pending application and that FIG. 1 is similar to the prior FIG. 1, but with certain additions to effect the automatic control features. As shown in FIG. 1, only one half of the mold is shown at 10 and includes a molding surface 12 and a plurality of blind bores 14. Alternative forms of the bores 14 are illustrated in FIG. 5 at FIGS. 14a, 14b, 14c, 14d, 14e, 14f, 14g, 14h, 14i, and 14j. These bores are connected through the sidewall of the mold with a common manifold 16 by means of the conduits 18, only one of which is shown in this figure.

Positioned vertically above the manifold 16 is a condenser 20 provided with means for circulating a coolant through the interior thereof and out of fluid contact with the coolant used for the mold cooling proper. As indicated in FIG. 1, this secondary coolant is admitted to the condenser through a feedline 22 which is connected to a coil surrounding the interior conduit carrying the primary mold coolant from the mold. The exit line for the secondary coolant is shown at 24. The upper end of the mold coolant system is vented to atmosphere by a valve 26 which valve is adjustable.

Flow of the secondary coolant through the condenser 20 is automatically controlled in accordance with the present invention, and the amount of flow is dictated by sensing the actual mold temperature as by means of a sensor 29 in thermal heat exchange relation with the mold and which generates a signal proportional to the mold temperature. This signal is fed to a temperature controller 30 where it is compared with a second voltage which is an adjustable set point. The voltage resulting from this comparison is then transmitted through the conductor 32 to a cooling water flow control valve 33 which is a proportional valve to reduce or increase the cooling water flow through the condenser depending upon the difference between the temperature sensed by the sensor 29 and that corresponding to the set point contained in the controller 30.

The bleed valve 26 is normally closed during stabilized operation of the molding machine. Under start-up conditions, however, the valve is opened under the control of a moisture detector 34 located on the discharge side of the valve.

Two different methods may be used for start-up of the molding process. In the first of these two methods, the cooling system is initially partially filled with a phase change liquid such as distilled water. Once the molding begins, the molds begin to heat up, and the normally closed bleed valve 26 is opened by the moisture detector 34 as air is purged from the system. As soon as moisture reaches the detector 34, the valve 26 is returned to its normally closed position. The valve 33 will remain closed until the temperature of the mold as sensed by the sensor 29 rises. This means that condensation in the condenser 20 is kept at a minimum during the start up process, and this also assists the purging of air from the system. However, when bleed valve 26 closes, the cooling control valve 33 will move to its fully opened position to provide maximum condensation in the condenser 20. This causes the minimum attainable pressure in the condenser 20 corresponding to a minimum heat extraction effect from the mold and therefore increases the rate of heating of the mold. As soon as the mold real temperature gets close to the set point, the cooling water control valve will begin to close initiating a flow restriction according to the proportional signal from the controller. This, in turn, creates a higher system pressure corresponding to an increased heat transfer from the molds to the primary coolant.

The other method for starting the molding process requires that no coolant be initially placed in the system. During the initial heating of the molds therefore the normally closed bleed valve is energized by the moisture detector 34 which keeps it open as the molds heat up toward the set point temperature, then a make-up valve 36 feeds a predetermined amount of coolant into the system. This coolant flows by gravity down to the molds where it begins to evaporate when it comes in contact with the hot metal wall of the molds. This again starts the air purging process and the valve 26 remains open until the moisture sensor 34 senses the presence of moisture in the evaporation path through the molds and closes the valve 26. Regardless of which start up method is employed, in the event that a maximum pressure in the system is reached and the mold temperature is still getting high, the make-up fluid valve 36 is operated a second time automatically by a pressure switch 35 to again supply a predetermined amount of coolant to the system. Obviously, the pressure switch 35 can be preadjusted to the desired operating system pressure.

As herein before indicated, FIGS. 2-5 inclusive are identical to FIGS. 2-5 of my co-pending application Ser. No. 152,323, filed Feb. 4, 1988. The detailed description of these figures is contained in said prior application and will not be repeated herein, such description being herein incorporated by reference.

As will be appreciated by those skilled in this art, the molding machinery to which the present invention is directed are large multi-mold machines for the simultaneous formation of a plurality of molded articles, such as glass bottles.

While a preferred embodiment of the present invention has been herein disclosed, applicant claims the benefit of a full range of equivalents within the scope of the appended claims.

I claim:

1. In a glass molding machine having a mold cooling system utilizing as a primary coolant a phase change liquid in a plurality of blind bores in each half mold connected to a common manifold which in turn is connected to a condenser positioned vertically above the mold and manifold for gravity return of condensed coolant to the molds, means affording circulation of a secondary coolant through said condenser and means for venting said condenser to ambient, the improvement comprising:
   a. temperature sensing means in the mold for generating a signal proportional to actual mold temperature;
   b. comparator means for comparing said signal with a set point reference signal and generating a control voltage proportional to the difference between said mold and set point signals;
   c. control means for adjusting the flow of secondary coolant to said condenser in response to the difference between said signals; and
   d. means responsive to the pressure of the primary coolant for adding a predetermined amount of primary coolant.

* * * * *